US012799816B1

(12) United States Patent
Stokes

(10) Patent No.: US 12,799,816 B1
(45) Date of Patent: Nov. 17, 2026

(54) SHADE BLIND ADAPTER

(71) Applicant: Robert C. Stokes, Truth or Consequences, NM (US)

(72) Inventor: Robert C. Stokes, Truth or Consequences, NM (US)

( * ) Notice: Subject to any disclaimer, the term of this patent is extended or adjusted under 35 U.S.C. 154(b) by 27 days.

(21) Appl. No.: 18/659,037

(22) Filed: May 9, 2024

(51) Int. Cl.
*E06B 9/76* (2006.01)

(52) U.S. Cl.
CPC .................................... *E06B 9/76* (2013.01)

(58) Field of Classification Search
CPC . F16B 45/04; E06B 9/76; E06B 9/322; E06B 2009/3222; E06B 2009/285; E06B 9/78; A47F 13/06
See application file for complete search history.

(56) References Cited

U.S. PATENT DOCUMENTS 1,345,027 A 6/1920 Rippe
1,533,812 A * 4/1925 Schleicher .............. F16B 45/04 59/93
1,536,701 A * 5/1925 Buckingham ........... B63B 21/58 114/230.3
2,116,880 A * 5/1938 Dee ....................... F16B 45/024 114/221 R
2,288,776 A * 7/1942 Bodendieck ........... H01R 11/15 81/112
2,316,428 A * 4/1943 Heinrich ................ H01R 11/15 81/53.1
2,630,730 A * 3/1953 Thornton ................. B25G 1/06 403/328
2,658,784 A * 11/1953 Runde .................... H01R 11/14 294/174
3,098,462 A * 7/1963 Holzman ................ B63B 21/54 114/221 R
5,038,843 A 8/1991 Sommerfeld
5,752,731 A * 5/1998 Crone .................... A62B 99/00 294/24
5,771,953 A 6/1998 Benthin
5,967,575 A * 10/1999 Blake ...................... B63B 21/54 114/221 R
6,171,033 B1 1/2001 Wrobel
6,409,240 B1 * 6/2002 Ferguson ................ B63B 21/54 114/221 R (Continued)

OTHER PUBLICATIONS

Blindparts offer for sale of 5/16 inch wand (Year: 2024).*

*Primary Examiner* — Daniel P Cahn
*Assistant Examiner* — John W Hanes, Jr.
(74) *Attorney, Agent, or Firm* — Gugliotta & Gugliotta LPA

(57) ABSTRACT

An adapter facilitates efficient adjustment of window blinds, particularly at elevated heights. The device includes a crank with a hook at one end to engage a blind's crank loop and a tang at the opposite end to couple with a rotary power tool, such as a cordless drill. A locking mechanism, featuring a pivoting clip controlled by a sliding lock and cable, secures the hook to the crank loop during operation and releases it when adjustment is complete. An optional manual handle, pivotable between stowed and deployed positions, provides a hand-operated alternative to rotate the crank. By enabling rotation via either the power tool or manual handle, the adapter raises or lowers the blind, enhancing efficiency and convenience, especially in settings with numerous or hard-to-reach blinds.

8 Claims, 4 Drawing Sheets

(56) References Cited

U.S. PATENT DOCUMENTS

| | | | | |
|---|---|---|---|---|
| 6,454,330 | B1 * | 9/2002 | Chen | B25J 1/04 294/104 |
| 6,901,825 | B1 | 6/2005 | Lebron | |
| 7,111,526 | B1 * | 9/2006 | Flojo | B25B 7/12 81/3.48 |
| 7,140,583 | B2 * | 11/2006 | Petzl | A63B 29/024 248/231.9 |
| 8,398,134 | B1 * | 3/2013 | Mortensen | B66F 19/00 294/191 |
| D776,507 | S | 1/2017 | Faverio et al. | |
| 9,656,381 | B2 * | 5/2017 | Niles | B25G 3/18 |
| 9,662,518 | B1 * | 5/2017 | Lay | B63B 21/54 |
| 9,789,506 | B2 * | 10/2017 | Kosta | B05B 15/628 |
| 10,005,331 | B2 * | 6/2018 | Jury | B60D 1/58 |
| 10,286,232 | B2 * | 5/2019 | Ostrobrod | A62B 35/0075 |
| D903,422 | S | 12/2020 | Bétry | |
| 11,247,325 | B2 * | 2/2022 | Jeremenko | B25B 21/00 |
| 11,279,007 | B1 | 3/2022 | Stoll | |
| 11,817,665 | B2 * | 11/2023 | O'Connell | H02G 1/02 |
| 2012/0284997 | A1 * | 11/2012 | Morin | H01R 11/14 294/174 |
| 2018/0345056 | A1 * | 12/2018 | Kekahuna | F16B 45/02 |
| 2019/0119981 | A1 * | 4/2019 | Marocco | E06B 9/42 |

* cited by examiner

SHADE BLIND ADAPTER

RELATED APPLICATIONS

There are no previously filed, nor currently any co-pending applications, anywhere in the world.

BACKGROUND OF THE INVENTION

1. Field of the Invention

The present invention relates generally to a tool for adjusting window blinds and, more particularly, to a device designed to facilitate the process of adjusting window blinds, especially those positioned at elevated heights.

2. Description of the Related Art

Adjusting window blinds, particularly those installed at heights beyond easy reach, can be a challenging and time-consuming task. This is especially true in commercial or institutional settings where large numbers of blinds need to be adjusted on a regular basis. Traditional methods of using ladders or reaching poles are often cumbersome and inefficient.

Some devices are known that attempt to address the challenges of adjusting elevated window blinds. For example:

U.S. Pat. No. 11,279,007 issued to Stoll teaches a telescopic crank handle drill bit. However, the examiner's statement of reasons for allowance indicates the patentability was based on "a hook, an extendable rod, and a drill attachment" in combination.

Despite these existing solutions, there remains a need for a simple, efficient and versatile tool to facilitate the adjustment of window blinds, particularly in contexts with large numbers of elevated blinds that require frequent adjustment. Such a tool should ideally leverage commonly available power tools to minimize manual effort. Additionally, an improved blind hook interface enabling more secure temporary connections to standard blind mechanisms would be beneficial.

SUMMARY OF THE INVENTION

It is thus an object of the present invention to provide an improved tool for adjusting window blinds.

It is a feature of the present invention to facilitate the process of adjusting window blinds, especially those positioned at elevated heights.

The present invention provides a shade blind adapter designed to facilitate efficient adjustment of window blinds. The device comprises a crank with a hook on one end configured to securely engage standard blind adjustment mechanisms. The opposite end of the crank features a tang compatible with common rotary power tools such as cordless drills or screwdrivers. A lock mechanism allows the hook to be temporarily locked to the blind mechanism during adjustment. An optional manual handle provides an alternative means to rotate the crank if desired.

In use, the hook is inserted into the adjustment loop of a window blind and locked in place. A power tool is then coupled to the tang and activated to rotate the crank, in turn adjusting the blind open or closed. Once adjustment is complete, the lock is disengaged and the hook removed, allowing the tool to be quickly moved to the next blind.

The shade blind adapter introduces a novel solution for efficiently managing the adjustment of large numbers of blinds, especially in commercial or institutional settings. By leveraging common power tools, it significantly reduces time and effort compared to manual methods. The locking hook feature enables more secure interfacing with blind mechanisms. Overall, the invention provides a substantial improvement in the field of window blind adjustment.

It is an advantage of the present invention to provide a tool that facilitates efficient adjustment of window blinds, especially those positioned at elevated heights.

It is another advantage of the present invention to leverage commonly available power tools, such as cordless drills or screwdrivers, to minimize the manual effort required in adjusting window blinds.

It is an advantage of the present invention to provide an improved blind hook interface that enables more secure temporary connections to standard blind adjustment mechanisms.

It is another advantage of the present invention to offer a versatile solution for managing the adjustment of large quantities of blinds, particularly in commercial or institutional contexts.

It is an advantage of the present invention to significantly reduce the time and effort associated with adjusting window blinds when compared to traditional manual methods.

It is another advantage of the present invention to provide a shade blind adjustment tool with a locking mechanism that ensures stable engagement with the blind during the adjustment process.

It is an advantage of the present invention to incorporate a manual handle option, allowing users the flexibility to adjust blinds without the need for a power tool when preferred.

It is another advantage of the present invention to offer a compact and easily portable design, facilitating quick transitions between multiple window blinds requiring adjustment.

It is an advantage of the present invention to cater to the needs of both individual residential users and professional maintenance staff tasked with managing larger quantities of window blinds.

It is another advantage of the present invention to introduce a novel and practical approach to window blind adjustment that addresses the challenges associated with elevated or hard-to-reach installations.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
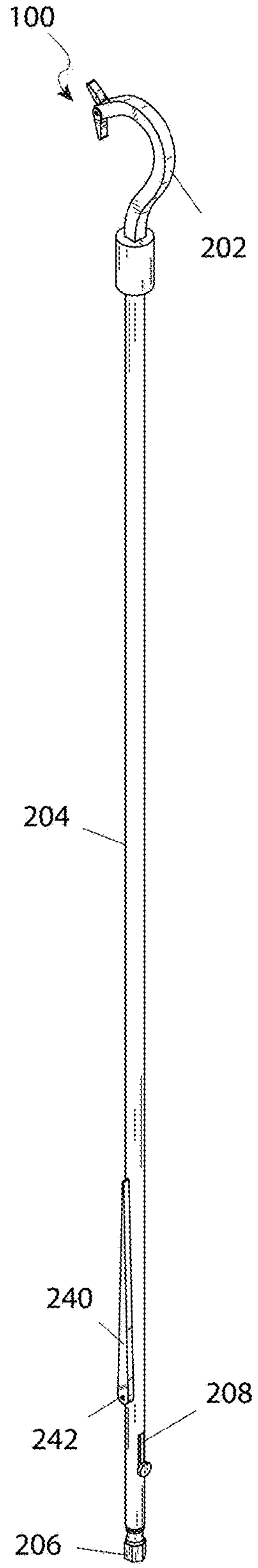
FIG. 1 is a rear isometric view of a shade blind adapter 100, according to an embodiment of the present invention.
Figure 2:
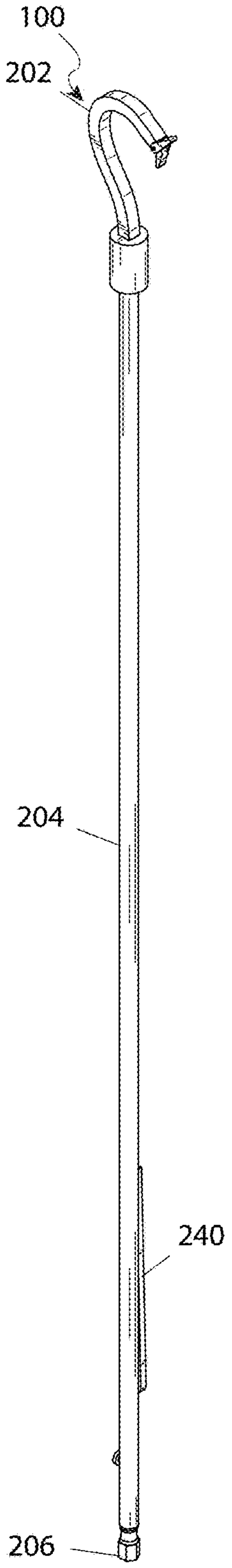
FIG. 2 is a front isometric view of a shade blind adapter 100, according to an embodiment of the present invention.
Figure 3:
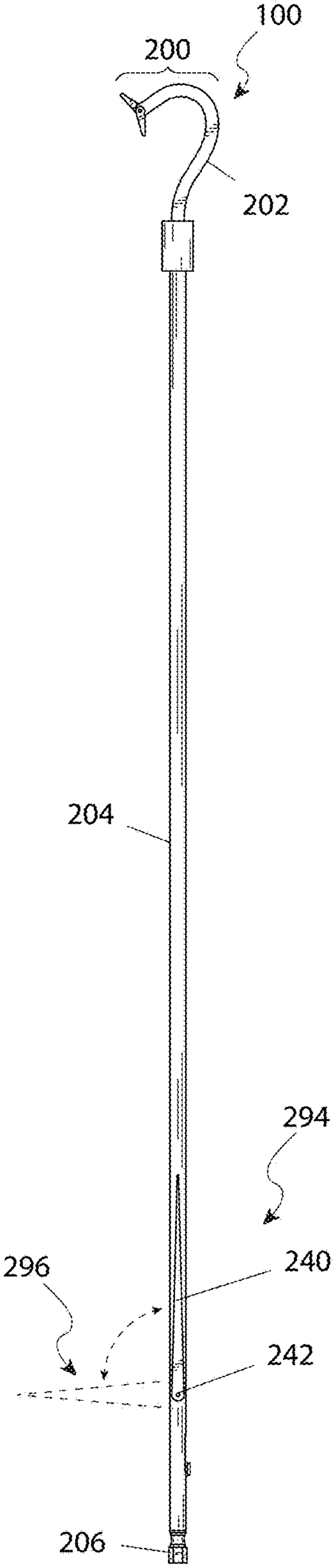
FIG. 3 is a left side view of a shade blind adapter 100, according to an embodiment of the present invention.
Figure 4:
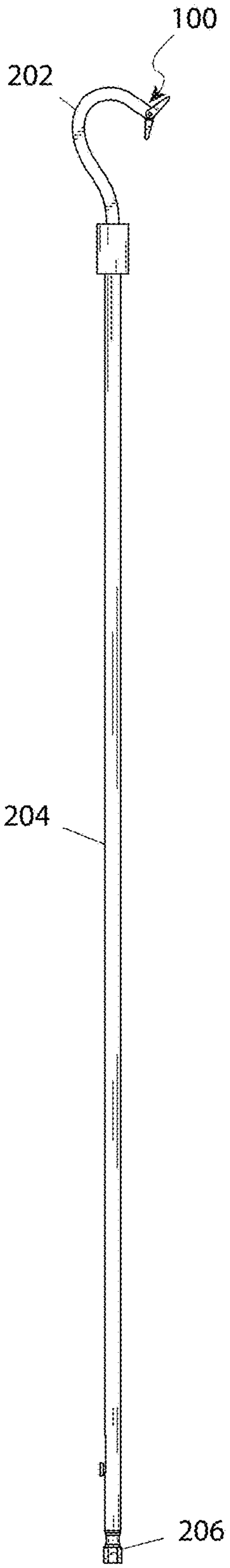
FIG. 4 is a right side view of a shade blind adapter 100, according to an embodiment of the present invention.
Figure 5:
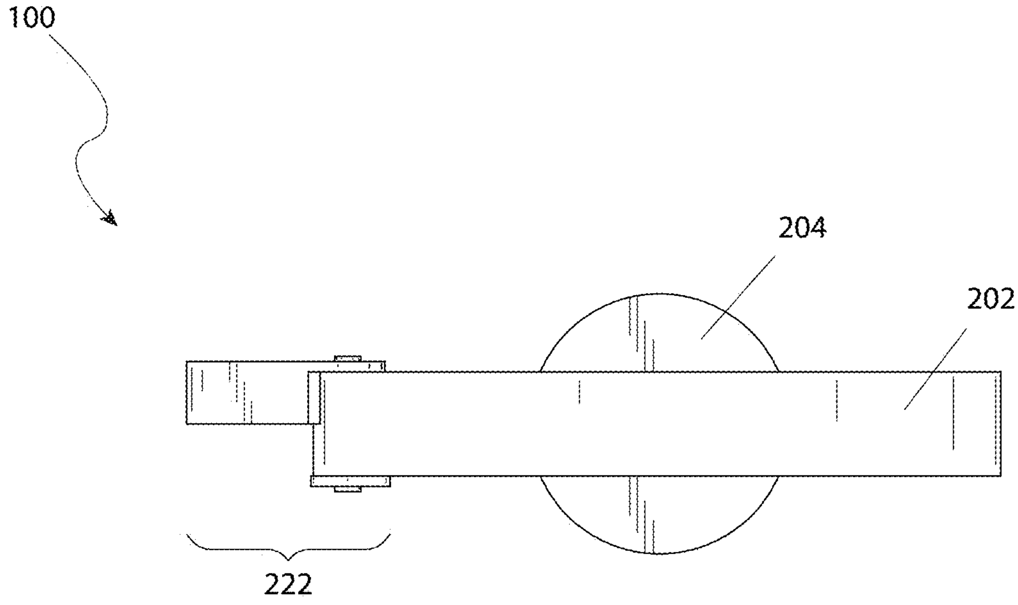
FIG. 5 is a top view of a shade blind adapter 100, according to an embodiment of the present invention.
Figure 6:
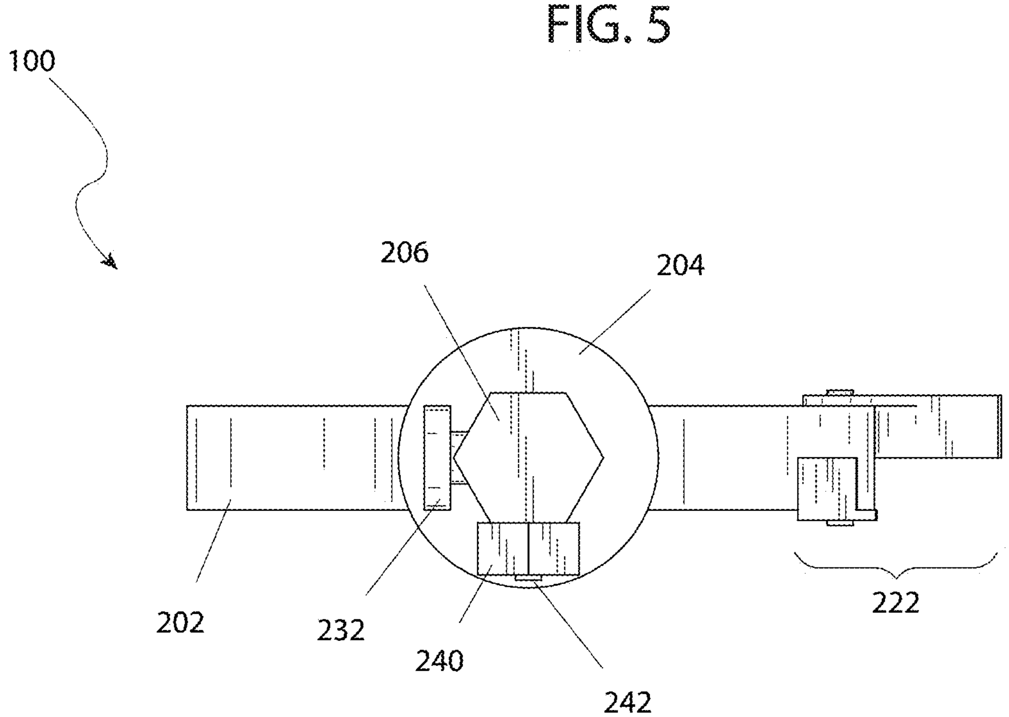
FIG. 6 is a bottom view of a shade blind adapter 100, according to an embodiment of the present invention.
Figure 7:
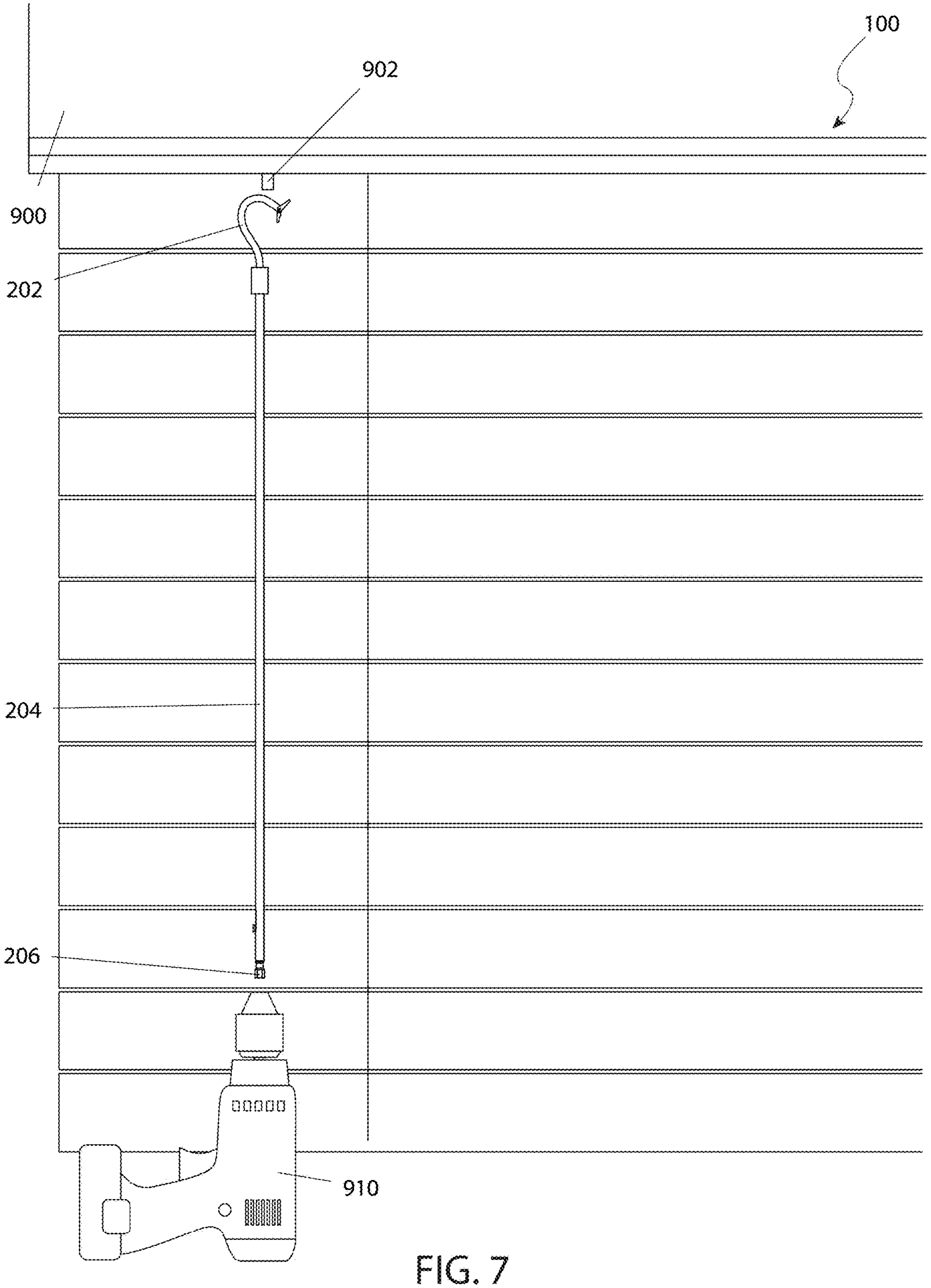
FIG. 7 is an in-use view of a shade blind adapter 100, according to an embodiment of the present invention; and, FIG. 8 is a detail view of a shade blind adapter 100, according to an embodiment of the present invention.
Figure 8:
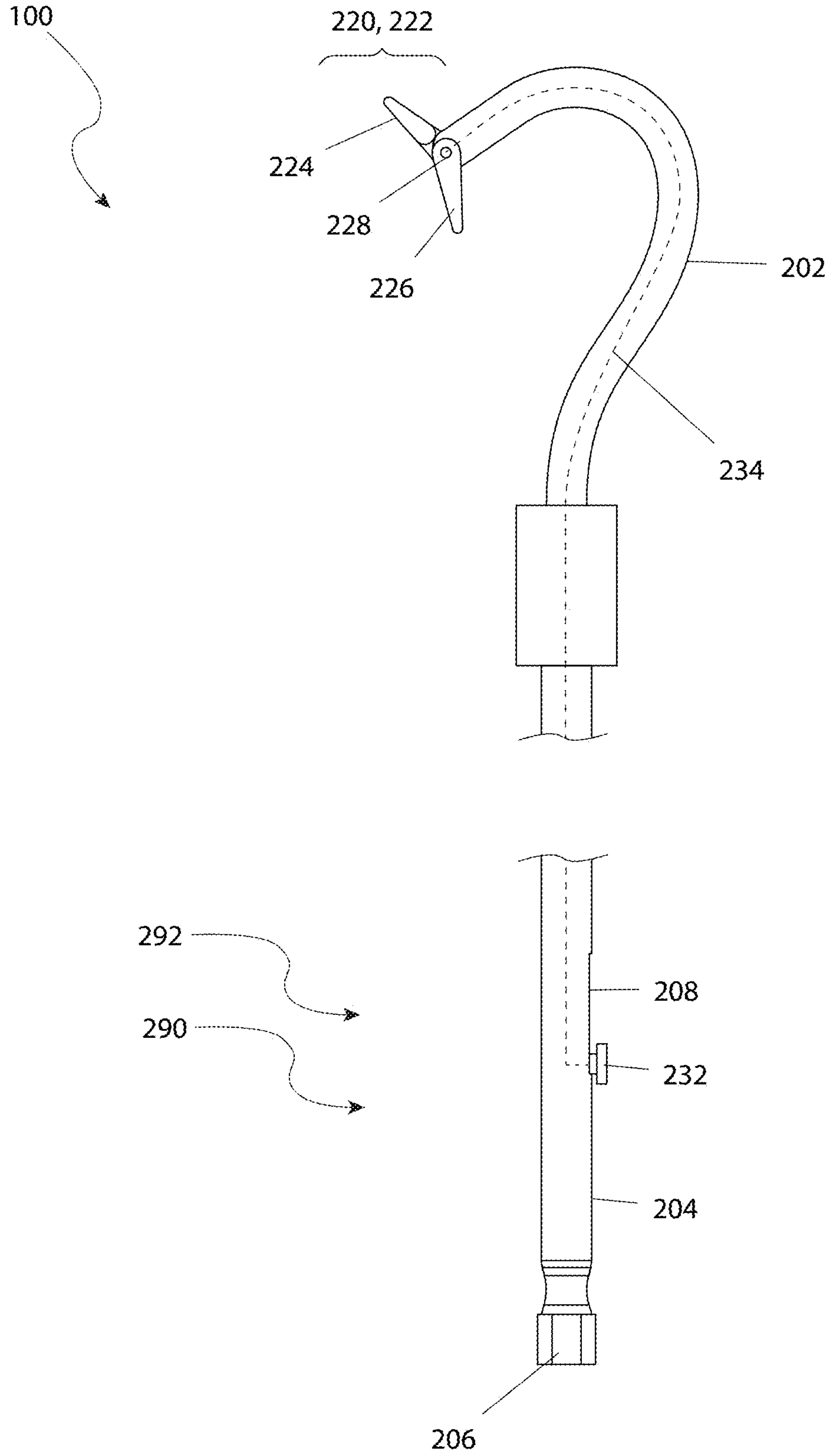

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, a shade blind adapter (herein described as the "invention") 100, is shown according to a preferred embodiment of the present invention. The invention 100 may comprise a crank 200, a lock mechanism, and a manual handle 240. The crank 200 may be operable to turn a crank loop 902 of a shade blind 900 in order to raise or lower the shade blind 900. The crank 200 may be detachably coupled to a rotary tool 910. As non-limiting examples, the rotary tool 910 may be a cordless drill or a cordless screwdriver. The lock mechanism may be operable to retain a hook 202 of the crank 200 in the crank loop 902. The manual handle 240 may be used as an alternative to the rotary tool 910 in order to rotate the crank 200.

The crank 200 may comprise the hook 202, a shaft 204, and a tang 206. The hook 202 may be a curved armature located at the top of the crank 200. The hook 202 may be configured to detachably couple to the crank loop 902 of the shade blind 900. The shaft 204 may be an armature that couples the hook 202 to the tang 206 and gives the crank 200 length needed to reach the crank loop 902. The tang 206 may be located at the bottom of the crank 200. The tang 206 may be configured to detachably couple to the rotary tool 910. In some embodiments, the tang 206 may be a hex shank.

The crank 200 may be hollow to house the lock mechanism.

The lock mechanism may comprise a lock head 220, a lock control 232, and a lock cable 234. The lock mechanism may prevent the hook 202 from being removed from the crank loop 902 when the lock control 232 is in a locked position 290. The lock mechanism may allow the hook 202 to be removed from the crank loop 902 when the lock control 232 is in an unlocked position 292. The lock head 220 may be the tip of the hook 202. The lock head 220 may be a clip 222 that may open and close to retain or release the crank loop 902. The lock control 232 may determine whether the clip 222 is open or closed. The lock control 232 may be slidably coupled to the shaft 204 via a lock control aperture 208. The lock cable 234 may couple the lock head 220 to the lock control 232 such that moving the lock control 232 changes the configuration of the lock head 220. The lock cable 234 may be routed through the hollow interior of the crank 200. Sliding the lock control 232 to the locked position 290 may open the clip 222 such that the hook 202 is prevented from pulling through the crank loop 902. Sliding the lock control 232 to the unlocked position 292 may close the clip 222 such that the hook 202 is able to pull through the crank loop 902.

The clip 222 may comprise a first clip half 224 and a second clip half 226. The first clip half 224 may be pivotably coupled to the second clip half 226 at a clip pivot 228. Sliding the lock control 232 to the locked position 290 may move the lock cable 234 such that the first clip half 224 and the second clip half 226 pivot apart to open the clip 222. Sliding the lock control 232 to the unlocked position 292 may move the lock cable 234 in the opposite direction such that the first clip half 224 and the second clip half 226 pivot together to close the clip 222.

The manual handle 240 may be an armature that is pivotably coupled to the shaft 204 via a handle pivot 242. The manual handle 240 may be located on the bottom half of the shaft 204. The manual handle 240 may be operable to manually rotate the shaft 204. The manual handle 240 may be stored in a handle stowed position 294 which may place the manual handle 240 parallel to the shaft 204. The manual handle 240 may be pivoted to a handle deployed position 296 for use. In the handle deployed position 296, the manual handle 240 may be oriented to be perpendicular to the shaft 204.

2. Operation of the Preferred Embodiment

In use, a user may insert the hook 202 of the invention 100 into the crank loop 902 of a shade blind 900 and may slide the lock control 232 to the locked position 290 to open the clip 222 that retains the hook 202 in the crank loop 902. The user may couple the tang 206 to the chuck of the rotary tool 910. The user may activate the rotary tool 910 to turn the shaft 204 in a first rotational direction in order to lower the shade blind 900 or in a second rotational direction in order to raise the shade blind 900. The user may slide the lock control 232 to the unlocked position 292 to close the clip 222 and may then remove the hook 202 from the crank loop 902.

In lieu of using the rotary tool 910 to rotate the shaft 204, the user may pivot the manual handle 240 from the handle stowed position 294 to the handle deployed position 296 and may rotate the shaft 204 manually using the manual handle 240.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical,* 520 US 17 (1997) or *Festo Corp*. v. *Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. A shade blind adapter comprising:

a crank having a hook on a first end and a tang on a second end, said hook configured to engage a crank loop of a shade blind, said tang configured to couple to a rotary tool;

a lock mechanism operable to retain the hook engaged with the crank loop in a locked state and release the hook in an unlocked state, said lock mechanism comprising:

a clip at a tip of the hook having a first clip half pivotably coupled to a second clip half;

a lock control slidably coupled to the crank; and;

a lock cable coupling the lock control to the clip, wherein sliding the lock control to a locked position pivots the first and second clip halves apart to retain the crank loop and sliding the lock control to an unlocked position pivots the first and second clip halves together to release the crank loop and a manual handle pivotably coupled to the crank by a handle pivot, said manual handle movable between a stowed position along the crank and a deployed position perpendicular to the crank;

wherein rotation of the crank by either the manual handle or a coupled rotary tool is operable to raise or lower the shade blind when the hook is engaged with the crank loop.

2. The shade blind adapter of claim 1, wherein:

the crank comprises an elongated shaft;

the tang comprises a hex shank configured to couple with a rotary power tool; and the hook is angled at approximately 45 degrees relative to the shaft.

3. The shade blind adapter of claim 2, wherein the hook prevents disengagement when the crank loop bends around the hook during operation.

4. The shade blind adapter of claim 2, wherein the manual handle is configured to lock in the stowed position.

5. The shade blind adapter of claim 2, wherein the hex shank is configured to couple with a cordless drill or cordless screwdriver.

6. A shade blind adjustment tool comprising:

a crank having a first end and a second end;

a tang disposed at the second end of the crank, said tang configured to couple to a rotary tool; and a hook and locking mechanism assembly disposed at the first end of the crank, said assembly including:

a hook configured to engage a crank loop of a shade blind; and a locking mechanism comprising:

a clip at a tip of the hook having a first clip half pivotably coupled to a second clip half, a lock control slidably coupled to the crank, and a lock cable coupling the lock control to the clip, wherein sliding the lock control to a locked position pivots the first and second clip halves apart to retain the crank loop and sliding the lock control to an unlocked position pivots the first and second clip halves together to release the crank loop;

wherein rotation of the crank by the rotary tool is operable to raise or lower the shade blind when the hook and locking mechanism assembly is engaged with the crank loop.

7. The shade blind adapter of claim 6, wherein the crank comprises an elongated shaft that is hollow.

8. A shade blind adjustment tool comprising:

a crank having a first end and a second end;

a tang disposed at the second end of the crank, said tang configured to couple to a rotary tool; and a hook and locking mechanism assembly disposed at the first end of the crank, said assembly including:

a hook configured to engage a crank loop of a shade blind;

a clip at a tip of the hook having a first clip half pivotably coupled to a second clip half at a clip pivot;

a lock control slidably coupled to the crank; and a lock cable coupling the lock control to the clip, wherein sliding the lock control to a locked position pivots the first and second clip halves apart to retain the crank loop and sliding the lock control to an unlocked position pivots the first and second clip halves together to release the crank loop;

wherein rotation of the crank by the rotary tool is operable to raise or lower the shaft blind when hook and locking mechanism assembly is engaged with the crank loop.

* * * * *